Patented Jan. 11, 1949

2,459,137

UNITED STATES PATENT OFFICE 2,459,137

PROCESS OF PRODUCING RESINOUS PRODUCTS FROM ACETYLENE AND SECONDARY AND TERTIARY ALKYL PHENOLS

Abraham O. Zoss, Easton, Pa., assignor to General Aniline & Film Corporation, New York, N. Y., a corporation of Delaware.

No Drawing. Application March 30, 1946, Serial No. 658,588

8 Claims. (Cl. 260—62)

The present invention relates to the production of resinous products from secondary and tertiary alkyl-substituted phenols and acetylene.

Valuable resinous products have heretofore been produced by condensing acetylene with various phenols, including tertiary alkyl-substituted phenols at superatmospheric pressures and temperatures of from 100° to about 300° C. the presence of zinc or cadmium salts of organic carboxylic acids or of organic nitrogenous bases such as amines as catalysts. These processes are described in U. S. Patents Nos. 2,027,199 and 2,072,825 to Reppe et al. It was believed, however, that the zinc or cadmium salts of organic carboxylic acids and the organic nitrogenous bases were unique in their action as catalysts and were essential if resinous products were to be obtained.

I have now found that valuable resinous products having properties quite similar to those obtained by the above-mentioned procedures can be obtained in the case of secondary and tertiary alkyl-substituted phenols by causing acetylene to act on such secondary or tertiary alkyl phenols at temperatures within the range of 150–300° C. and preferably in the range of 200–250° C. and under superatmospheric pressure in the presence of 1–20% and preferably 1–5% of an alkali metal compound having a strongly alkaline reaction.

The catalysts which I employ are the alkali metal oxides, hydroxides and the like which, with the phenol employed, will form a phenolate. If desired, the catalysts employed may be employed in the form of a pre-formed phenolate or alcoholate. Examples of suitable catalysts are the oxides, carbonates and hydroxides of the alkali metals, e. g., sodium, potassium, lithium, rubidium and cesium, or their alcoholates with such alcohols as methanol, ethanol, propanol, butanol and the like, or the phenolate of the alkali metals with any of the secondary or tertiary phenols mentioned above or other phenolic compounds, for instance, phenol or cresols.

For the production of valuable resinous products in accordance with the present invention, I have found those phenolic compounds which contain a secondary or tertiary alkyl group as a substituent and which are unsubstituted in two of the positions—ortho and para—to a hydroxyl group to be suitable. As specific examples of such secondary and tertiary alkyl phenols may be mentioned o- and p-isopropyl phenol, o- and p-secondary and tertiary butyl phenols, o- and p-cyclohexyl phenol, o- and p-secondary octyl phenols, o- and p-(1,1,3,3-tetramethylbutyl)-phenol, o- and p-secondary and tertiary amyl phenols, o- and p-secondary and tertiary nonyl phenols and o- and p-secondary and tertiary dodecyl phenols. I particularly prefer the monosubstituted tertiary alkyl phenolic compounds obtained by condensing phenol with an olefine or a tertiary alkyl halide or alcohol containing from 3 to about 12 carbon atoms. In place of the phenols mentioned above, there may also be employed the corresponding secondary and tertiary alkyl substituted meta-cresols. It is also possible to obtain valuable resinous products employing the secondary and tertiary alkyl substituted resorcinols. However, when dihydroxy phenolic compounds are employed, the resinous products obtained are generally somewhat more infusible and insoluble than is the case when the alkyl phenols and cresols are employed.

In practicing the present invention, valuable resinous products are obtained with a relatively wide range of molar proportions of secondary and tertiary alkyl substituted phenols and acetylene. The preferred ranges of secondary and tertiary alkyl substituted phenols to acetylene are within the ranges of 3:1 to 1:3. However, valuable products may be obtained within the range of about 10:1 to about 1:10.

The reaction is preferably carried out at superatmospheric pressures and at a temperature within the range of 150–300° C.—preferably between 200 and 250° C. It must be borne in mind that at these temperatures acetylene is liable to explode and it is therefore advisable to dilute the acetylene with an inert gas, as for example, nitrogen, hydrogen, methane, ethane and the like, in order to preclude the possibility of explosion. When diluted with such inert gases in the ratio of about 2 to 3 parts of inert gas to 1 part of acetylene, a pressure within the range of 150–300 pounds per square inch is required in order for a satisfactory rate of reaction to be obtained. However, as disclosed in copending application of Beller, Christ and Wuerth, Serial No. 621,620, by carbureting the acetylene with a normal liquid inert organic diluent such as cyclohexane or mixtures of saturated hydrocarbons such as occur in petroleum fractions, a substantially smaller amount of diluent may be employed and reaction carried out at a lower pressure and/or temperature. The exact pressure to be employed will therefore vary somewhat with the particular diluent employed. In general, however, the pressure will be such that the partial pressure of the acetylene will be from about 2 to about 8.5 atmospheres.

By varying the amount of catalysts and relative proportions of acetlyene and phenols, the temperature of reaction and selection of particular secondary or tertiary alkyl phenols, resinous products having a wide variety of properties and varying from viscous to semi-hard or hard products may be obtained. Likewise, resinous products having varying solubilities from readily-soluble to partly-soluble or only capable of swelling in organic solvents such as acteone, methanol, ethanol, diethylether, benzene, xylene and the like may be obtained. The resinous products obtained in accordance with the present invention are similar to those obtained under similar conditions as regards the phenol employed, the temperature and ratio of acetylene to phenol in the processes disclosed in the above-mentioned U. S. Patents Nos. 2,027,199 and 2,072,825. Depending on their properties, they may be employed either directly or after subsequent purification as tackifiers for natural and synthetic rubbers and in the preparation of lacquers, varnishes, insulating agents, adhesive compositions and the like. In some of these preparations, the resinous products may be mixed with fillers, such as carbon black, pigments and dyes. They are also compatible with a wide variety of other natural and synthetic resins and waxes and make valuable modifiers for such products.

The resinous products may also be sulphonated, if desired, in order to obtain valuable synthetic tanning agents, cation exchange resins and the like.

The following example (in which the parts are by weight) illustrates a typical preferred embodiment of this invention:

Example 500 parts of p-tertiary butyl phenol and 8 parts of potassium hydroxide were charged into a pressure vessel having an efficient stirrer. Air was removed by purging with nitrogen and the charge in the reactor was then heated to 210° C., nitrogen being admitted until the internal pressure was 145 pounds per square inch. Acetylene was then added until a total pressure of 200 pounds per square inch was obtained and the reaction mass was maintained at 210° C. and under a pressure of 200 pounds per square inch by the continuous addition of acetylene for 24 hours. During this period, 145 parts of acetylene were added. The reaction mass was then cooled and the pressure released. There was thus obtained a resinous product having a molar ratio of p-tertiary butyl phenol to acetylene of 1:0.96. This material had a molecular weight of about 600 and a Ubbelohde drop point of 116.5° C. It was soluble in methanol, ethanol, acetone, benzene, cyclohexane, petroleum ether, ethyl acetate, diethyl ether, normal butanol and it was found to be particularly valuable as a tackifier for natural and synthetic rubbers.

By substituting p-tertiary amyl phenol or p-(1,1,3,3-tetramethylbutyl) phenol for the p-tertiary butyl phenol in the above example, similar products which are valuable as tackifiers for natural and synthetic rubbers may be obtained.

I claim:

1. The method of producing resinous condensation products, which comprises causing acetylene to act at a temperature between 150° and 300° C. and at a superatmospheric pressure on a compound selected from the group consisting of phenols and cresols having an alkyl substituent selected from the class consisting of secondary and tertiary alkyl groups containing 3 to 12 carbon atoms, but which are free of substituents other than alkyl groups and which are unsubstituted in two of the positions ortho and para to a hydroxy group, in the presence of a strongly alkaline-reacting alkali metal compound as a catalyst.

2. The method of producing resinous condensation products, which comprises causing acetylene to act at a temperature between 200° and 250° C. and at a superatmospheric pressure on a compound selected from the group consisting of phenols and cresols having an alkyl substituent selected from the class consisting of secondary and tertiary alkyl groups containing 3 to 12 carbon atoms, but which are free of substituents other than alkyl groups and which are unsubstituted in two of the positions ortho and para to a hydroxy group, in the presence of a strongly alkaline-reacting alkali metal compound as a catalyst.

3. The process of producing resinous condensation products, which comprises causing the non-explosive mixture of acetylene and an inert gas to react at a temperature of 150° to 300° C. and at such pressure that the partial pressure of acetylene is from about 2 to about 8.5 atmospheres on a compound selected from the group consisting of phenols and cresols having an alkyl substituent selected from the class consisting of secondary and tertiary alkyl groups containing from 3 to 12 carbon atoms, but which are free of substituents other than alkyl groups and which are unsubstituted in two of the positions ortho and para to a hydroxy group, in the presence of a strongly alkaline-reacting alkali metal compound as a catalyst.

4. The process as defined in claim 1, wherein the alkyl phenol is p-tertiary butyl phenol.

5. The process as defined in claim 2, wherein the alkyl phenol is p-tertiary butyl phenol.

6. The process as defined in claim 3, wherein the alkyl phenol is p-tertiary butyl phenol.

7. The process as defined in claim 3 wherein the alkyl phenol is p-tertiary amyl phenol.

8. The process as defined in claim 3 wherein the alkyl phenol is p-(1,1,3,3-tetramethylbutyl)-phenol.

ABRAHAM O. ZOSS.

REFERENCES CITED

The following references are of record in the file of this patent:

UNITED STATES PATENTS

| Number | Name | Date |
| --- | --- | --- |
| 2,027,199 | Reppe et al. | Jan. 7, 1936 |